Patented Apr. 22, 1924.

1,491,779

UNITED STATES PATENT OFFICE.

ERNEST A. WILDMAN, OF RICHMOND, INDIANA, ASSIGNOR TO SWAN-MYERS CO., OF INDIANAPOLIS, INDIANA, A CORPORATION OF INDIANA.

MAGNESIUM ORTHO-BENZYLOXYBENZOATE.

No Drawing.     Application filed June 9, 1923.  Serial No. 644,459.

*To all whom it may concern:*

Be it known that I, ERNEST A. WILDMAN, a citizen of the United States, residing at Richmond, in the county of Wayne and State of Indiana, have invented a new and useful Magnesium Ortho-Benzyloxybenzoate, of which the following is a specification.

My invention relates to magnesium ortho-benzyloxybenzoate, the magnesium salt of ortho-benzyloxybenzoic acid, having the following formula:

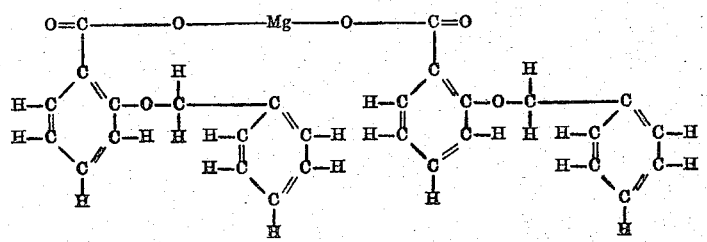

This may be considered as a derivative of salicylic acid, in which the hydrogen atoms of the carboxyl groups have been replaced by an atom of magnesium, and the hydrogen atoms of the phenolic hydroxyl groups have been replaced by the benzyl radical; or as a derivative of the magnesium salt of salicylic acid, in which the hydrogen atom of the phenolic hydroxyl group has been replaced by the benzyl radical.

It is the object of my invention to produce a readily administered water-soluble medicinal compound which has the desirable properties of the benzyl radical combined with those of the salicyl radical, and which at the same time is free or more nearly free from the objectionable features of the compounds at present used to obtain these medicinal effects, such as benzyl benzoate on the one hand and salicylic acid on the other hand; and which has a high acid-radical content, and can be obtained in solid form by evaporation of its water solution. This salt is probably most conveniently prepared by using ortho-benzyloxybenzoic acid as the starting point, especially when the pure salts are desired; though the salt can be made without first making the acid as an isolated product.

A process of preparation of the acid is as follows: 23 parts by weight of metallic sodium are dissolved in about 400 parts of alcohol, using either methyl alcohol or ethyl alcohol, 150 parts of methyl salicylate and 130 parts of benzyl chloride are added, and the mixture is boiled until, usually after about an hour, it is apparent from precipitation of sodium chloride that the re-action is complete. The usual care in handling metallic sodium should of course be exercised in dissolving it in the alcohol, because of the violence of the reaction. The alcohol is then distilled off (and preferably recovered) from the remaining oil, and this remainder is shaken with water to remove the sodium chloride and any saponified material. After such removal, the remaining oily material is then boiled with 45 parts of sodium hydroxide in about 300 parts of water until the mixture becomes homogeneous due to saponification of the oil. The resulting solution, of sodium ortho-benzyloxybenzoate, is acidified with 55 parts of sulphuric acid, and the precipitated oil is collected and crystallized from its solution in a suitable solvent, such as carbon tetrachloride or alcohol. This product which is ortho-benzyloxybenzoic acid, is a crystalline white powder, odorless and substantially tasteless (though some palates get a slight sharp burning taste), insoluble in water, and easily soluble in dilute alkalis and most organic solvents. Its melting point is 75° C. Its chemical structure is shown by the formula given above, save that two hydrogen atoms are substituted for the magnesium atom, to produce two molecules of the acid.

A typical method for the preparation of the magnesium salt from this acid is as follows:

Two molecular proportions of ortho-benzyloxybenzoic acid and one molecular proportion of powdered magnesium carbonate are boiled together in about twenty parts of water until the evolution of carbon dioxide has ceased. The solution is then cooled, and the crystalline precipitate, which is the magnesium salt, is filtered off and washed with a little cold water.

The foregoing process of preparation is given merely by way of example, and my invention is not limited to products obtained by the process given.

The magnesium salt (magnesium ortho-benzyloxybenzoate) is a substantially white powder soluble in water—in about 34 parts of water at 20° C. It has an acid-radical content of about 95%. It is obtainable in solid form by evaporation of its water solution. It does not have its solubility materially increased by the addition of ammonia.

I claim as my invention:

The magnesium salt of ortho-benzyloxybenzoic acid.

In witness whereof, I have hereunto set my hand at Richmond, Indiana, this 6th day of June, 1923.

ERNEST A. WILDMAN.